(12) United States Patent
Herring et al.

(10) Patent No.: US 7,320,336 B2
(45) Date of Patent: Jan. 22, 2008

(54) PLUG INCORPORATING PRESSURE-SENSITIVE VALVE

(75) Inventors: William Peter Herring, Rudge (GB); James Moore, Frome (GB)

(73) Assignee: Hornbeam Ivy Limited, Somerset (GB)

( * ) Notice: Subject to any disclaimer, the term of this patent is extended or adjusted under 35 U.S.C. 154(b) by 86 days.

(21) Appl. No.: 11/345,515

(22) Filed: Feb. 2, 2006

(65) Prior Publication Data
US 2006/0237070 A1    Oct. 26, 2006

(30) Foreign Application Priority Data
Apr. 25, 2005  (GB) ................. 0508355.5

(51) Int. Cl.
*F16K 5/10*  (2006.01)
(52) U.S. Cl. .................... 137/614.17; 137/614.18; 137/540; 137/514; 251/318; 251/339
(58) Field of Classification Search ................ 251/231, 251/234, 236, 242, 244, 238, 318, 339, 144; 4/691, 692; 137/511, 528, 531, 535–538, 137/540, 614.17, 614.16, 614.19, 514
See application file for complete search history.

(56) References Cited
U.S. PATENT DOCUMENTS

| | | | |
|---|---|---|---|
| 2,553,991 A * | 5/1951 | Wagner et al. ................. 4/692 |
| 3,662,950 A * | 5/1972 | McIntosh et al. ........ 236/92 C |
| 3,911,508 A | 10/1975 | Goldberg |
| 4,597,112 A | 7/1986 | Cuschera |
| 4,903,943 A * | 2/1990 | Hochstrasser .................. 4/692 |
| 5,105,850 A * | 4/1992 | Harris ...................... 137/513.3 |
| 5,494,069 A * | 2/1996 | Bergmann ............... 137/493.2 |
| 6,219,861 B1 * | 4/2001 | Chen ............................. 4/693 |
| 6,779,554 B2 * | 8/2004 | Weis et al. ................. 137/540 |

FOREIGN PATENT DOCUMENTS

| | | |
|---|---|---|
| AU | B-30611/95 | 3/1996 |
| GB | 1358773 | 7/1974 |
| GB | 2261600 A | 5/1993 |
| GB | 2 285 216 A | 7/1995 |
| WO | WO 91/16847 | 11/1991 |
| WO | WO 03/102314 A1 | 12/2003 |

* cited by examiner

*Primary Examiner*—Kevin Lee
(74) *Attorney, Agent, or Firm*—Stites & Harbison PLLC; Ross F. Hunt, Jr.

(57) ABSTRACT

A plug which is insertable into a outlet from a vessel, to seal the vessel so that it may hold liquid. To prevent overflow, the plug has an in-built valve which automatically opens when it experiences a predetermined threshold pressure. The threshold pressure can be adjusted to cater for vessels of differing size.

16 Claims, 6 Drawing Sheets

PLUG INCORPORATING PRESSURE-SENSITIVE VALVE

FIELD OF THE INVENTION

This invention relates to a plug for closing a liquid outlet. For example, it relates to a plug which acts as a stopper for closing drainage outlets from bathroom vessels (e.g. sinks, baths, etc.)

BACKGROUND OF THE INVENTION

Fixed vessels (e.g. sinks, baths etc.) for holding liquid generally have an outlet e.g. positioned at the lowest point thereof to allow used liquid to drain away e.g. to a main sewer. In order for the vessel to hold liquid without draining occurring it is necessary to seal the outlet. Sealing can be achieved by stopping the outlet using a rubber disc. The disc can be attached to the vessel by a chain to facilitate removal. Alternatively, the disc can be part of an in-built mechanism operable by a lever, commonly known as a pop-up waste. By sealing the outlet, the risk of overflow of the vessel is created. To avoid this problem, extra outlets are provided in vessels at a certain height from the lowest point. This means that liquid will flow out of these outlets when the height in the vessel is above a predetermined amount. These so-called "overflows" remove the risk of flooding caused by overfilling the vessel.

However, overflow channels have disadvantages. Firstly, they are difficult to clean because by their nature they must include a relatively long enclosed channel. They easily become dirty and can be unsightly. Secondly, they are relatively difficult to manufacture. Traditional bathroom/ kitchen vessels are made from china, and the formation of a self-contained channel presents certain design and manufacturing limitations.

Furthermore, more modern vessel designers use different materials, some of which are transparent (e.g. glass). Overflow channels are not provided in these vessels because of the problem of cleaning and unsightliness mentioned above. There is therefore a risk of overfilling these vessels.

SUMMARY OF THE INVENTION

It is an aim of the present invention to obviate the need for an overflow channel.

At its most general, a first aspect of the invention provides a plug, e.g. for acting as a stopper for a drainage outlet in a vessel (e.g. a bathroom vessel), having a pressure-sensitive valve arranged to cause the plug to open automatically when a certain pressure e.g. due to a given weight of liquid in the vessel is reached. The plug therefore acts as both a sealing element and a safety (e.g. overflow prevention) mechanism. This allows the vessel to possess only one drainage outlet.

Thus, according to the first aspect of the invention, there may be provided a combination of a vessel having an outlet and a plug which is insertable into and removable from the outlet to close the vessel thereby allowing it to hold liquid, the combination having:

a conduit for locating in the outlet such that liquid cannot pass through the outlet without also passing through the conduit; and a valve located in the conduit, wherein in use the valve is arranged to maintain a first configuration in which the conduit is sealed to prevent liquid from passing therethrough unless pressure on the valve reaches a threshold value, whereupon the valve is arranged to adopt a second configuration in which the conduit is open to allow liquid to flow therethrough.

Preferably, the conduit and valve are included together in the plug, i.e. the valve may be permanently located in the conduit. Preferably, the plug includes sealing means for sealing the conduit in the outlet. Thus, in use, the plug is placed into the outlet e.g. in the conventional way. The plug may be attached to the vessel by a chain to facilitate removal, or it may be a separate free-standing body. Alternatively, it may be implemented using the conventional pop-up lever technique. When the plug is located in the outlet, the sealing means preferably abuts the interior of the outlet to seal the conduit therein so that the only way liquid (e.g. water) can exit the vessel through the outlet is via the conduit. Usually, a pipe (e.g. U-bend) extends away from the outlet to the drain. The conduit is preferably shaped to fit snugly in the pipe.

In its rest state, the conduit is preferably sealed by the valve. Thus, when the plug is initially placed in the outlet, the outlet is sealed and the vessel can be filled with liquid. As the vessel fills with liquid, the pressure caused by the weight of liquid acting on the valve increases. When the pressure reaches a predetermined value (i.e. a threshold value), it triggers the opening of the valve, thereby allowing water to flow through the conduit, i.e. out of the vessel through the outlet. By selecting the threshold value suitably, the valve may be opened by pressure from a height of water lower than the rim of the vessel so overflow can be avoided.

Preferably, the valve is biased into the first configuration, the biasing force being selected so that pressure at and above the threshold value overcomes it (i.e. acts against the biasing force to cancel it out) to cause the valve to adopt the second configuration. The biasing force may be applied using a spring. Thus, the plug occupies the first configuration (e.g. sealed conduit) in its rest state.

Preferably, the valve includes a sealing element movable relative to the conduit between a first position where the valve is in the first configuration and a second position where the valve is in the second configuration. The sealing element therefore preferably effects sealing of the inside of the conduit.

Preferably, the sealing element is movable along the axis of the conduit. The sealing element may include a sleeve slidably mounted on a boss which is fixed relative to the conduit in use. The sleeve may be biased against the boss, e.g. using a spring, to urge the sealing element into the first position.

Preferably, the valve includes a plate whose periphery seals against the inside of the conduit in the first configuration. The plate may be part of the movable sealing element. The plate may have an o-ring or other suitable sealing agent around its periphery to ensure sealing integrity. The conduit may have a constricted portion against which the plate, e.g. the periphery of the plate or the o-ring, abuts to form a seal in the first configuration. The arrangement may be such that the plate has an area less than the cross-sectional area of the conduit, but the conduit includes an inwardly projecting ridge which prevents movement of the plate past it. The plate is therefore preferably biased against the ridge to seal the conduit in the first configuration, but suitable pressure can push it away from the ridge to allow liquid to escape past the gap between the ridge and plate in the second configuration. Preferably, the conduit is substantially cylindrical and the plate is a disc. The gap for liquid flow may then have an annular shape in the second configuration.

Preferably, the plug includes an adjuster for adjusting the valve so that it reacts to a different threshold value. In other words, the pressure at which the valve opens can be selected. The adjuster may be arranged to alter the biasing force, e.g. by varying the strength of the spring. This may be achieved by permitting the axial position of the boss, which is fixed in use, to be varied, e.g. through a screw adjustment. The adjuster permits the plug to be operable in a variety of vessel sizes, since the valve can be made to react to a variety of pressures i.e. responsive to variety of different liquid weights (heights).

When used with a pop-up lever, the plug preferably includes a height adjusting mechanism to enable the outlet to be properly sealed when closed by the plug.

Preferably, the sealing means includes a protruding ridge around the outside of the conduit, e.g. to abut the edges of the outlet to form a seal. The ridge may include an o-ring or other suitable sealing agent to ensure integrity of the seal. The ridge may be at one end of the conduit so that the plug can be substantially completely inserted into the outlet to lie flush with the vessel base. The conduit may protrude in use.

Most vessels have liquid dispensing apparatus, e.g. taps located over the outlet. In a development of the present invention, the plug preferably includes a cover for shielding the valve. The cover is preferably separated (e.g. axially) from the conduit to allow liquid to flow under it onto the valve. The cover prevents liquid flow from the tap from directly impinging on the valve and accidentally causing it to adopt the second configuration. The cover is therefore preferably located over the mouth of the conduit, and may protrude above the outlet when the plug is fitted in use. The cover may be mushroom-shaped, i.e. it may have a rounded upper surface to deflect liquid incident thereon. The cover may be made of material selected to match the tap, e.g. metal, preferably stainless steel.

The first aspect of the invention may alternatively be expressed as a plug which is insertable into and removable from an outlet from a vessel to close the vessel thereby allowing it to hold liquid, the plug having:

a conduit for locating in the outlet;

sealing means for sealing the conduit in the outlet such that liquid cannot pass through the outlet without also passing through the conduit; and a valve located in the conduit, wherein in use the valve is arranged to maintain a first configuration in which the conduit is sealed to prevent liquid from passing therethrough unless pressure on the valve reaches a threshold value, whereupon the valve is arranged to adopt a second configuration in which the conduit is open to allow liquid to flow therethrough.

The plug may be made from any material, but is preferably made of plastic.

An alternative solution to the problem which is a second aspect of the invention is also proposed. At its most general, the second aspect provides a pressure-sensitive valve for releasably closing a conduit, wherein the closing function of the valve can be manually overridden.

Thus, according to the second aspect of the invention, there may be provided a stopper for controlling liquid flow through a conduit, the stopper including:

a valve member mounted in the conduit, the valve member being urged into sealing contact with the conduit to prevent liquid flow therethrough; and override means arranged to move the valve member out of sealing contact with the conduit to allow liquid flow therethrough.

Thus, the valve member may be movable between two positions. In a first position, it may be urged into sealing contact with the conduit whereby it acts essentially as a pressure-sensitive valve, i.e. when in use in the first position, the valve member maintains a first configuration in which the conduit is sealed to prevent liquid from passing therethrough unless pressure on the valve member reaches a threshold value, whereupon the valve is arranged to adopt a second configuration in which the conduit is open to allow liquid to flow therethrough. In a second position, the valve member may be positioned such that the conduit is open, and liquid can flow freely therethrough.

The valve member is preferably urged by biasing means, e.g. a spring or over resilient biasing agent. Preferably, the valve member is biased against a base. The override means may move the valve member against the biasing force. However, it is preferred that the base itself is movable by the override means. In this case, the override means need not act against the biasing means; the entire valve mechanism (e.g. the valve member, biasing means and base) may be movable so that the valve member moves into and out of engagement with the conduit.

The conduit in the second aspect may be a pipe leading away from the outlet of a vessel. In this case, the stopper may act as a plug for the vessel.

Sealing contact may be achieved using a seal around the rim, e.g. protruding from the rim, of the valve member. The seal may be an o-ring or other suitable sealing agent. The seal may abut a inwardly projecting ledge in the conduit.

The override means may include a lever, e.g. a manually operable lever, for moving the valve member. The valve member is preferably movable along the axis of the conduit.

The override means may resemble a pop-up lever.

Preferably, the valve member includes an adjuster for adjusting the biasing force and a height adjusting mechanism, e.g. when the override means includes a lever, as explained above with reference to the first aspect.

In the second aspect of the invention, the means for overriding the pressure-sensitive valve, i.e. the overflow prevention mechanism, to allow liquid to flow freely through the conduit preferably moves the valve member as a whole in the same direction as the movement of the sealing means when pressure causes the valve to open. In contrast, in the first aspect of the invention, the plug is preferably opened by being moved in a direction opposite to the movement of the sealing means when pressure causes the valve to open.

BRIEF DESCRIPTION OF THE DRAWINGS

Examples of the present invention is now described with reference to the accompanying drawings, in which.

DETAILED DESCRIPTION OF THE PREFERRED EMBODIMENTS

Figure 1:
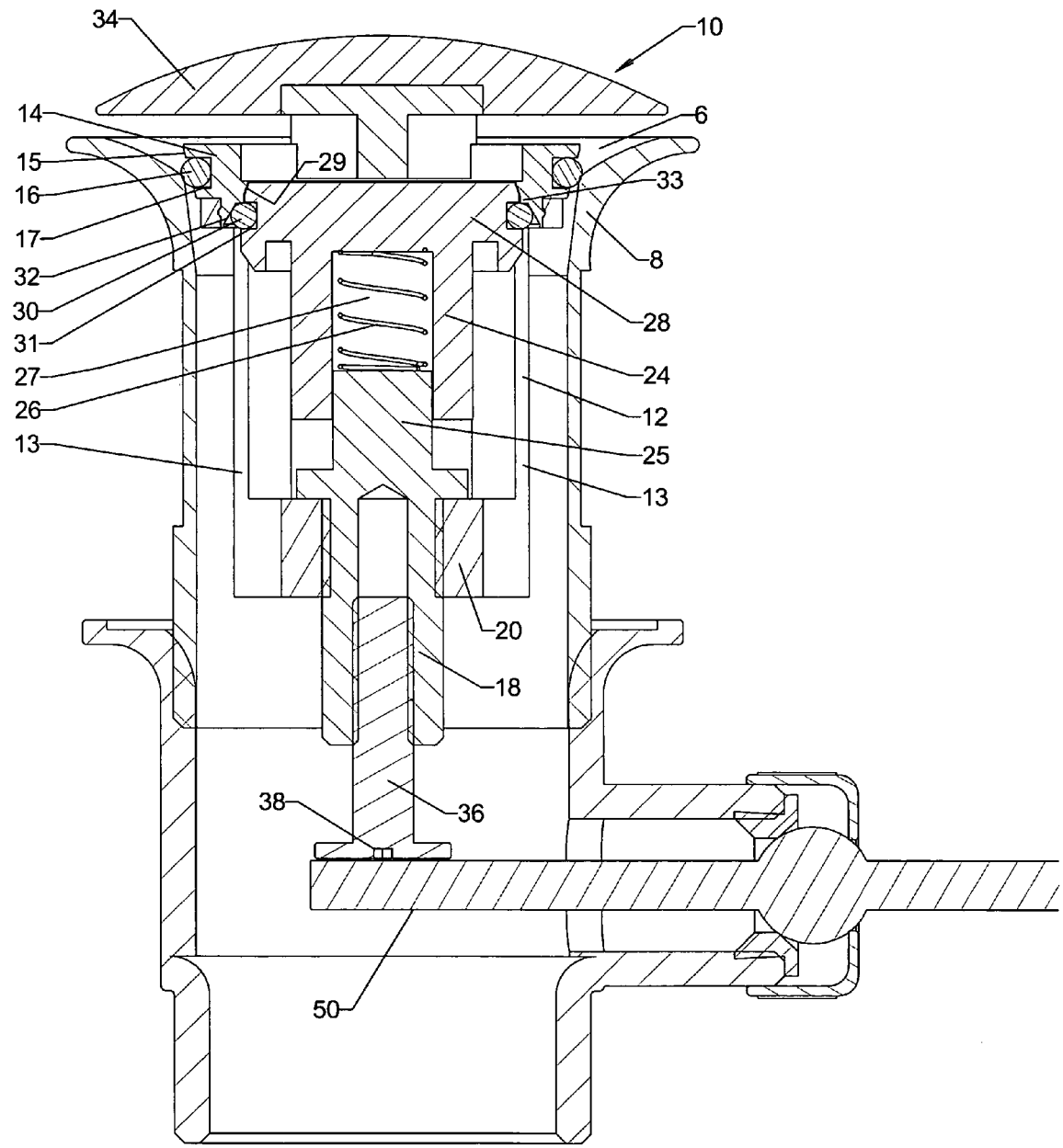
FIG. 1 shows a cross-sectional view through a plug which is a first embodiment of the invention, where the plug is located in the plug hole of a vessel in a closed configuration with its internal valve also being closed.

FIG. 1 shows a cross-sectional view through a plug 10 inserted in a plug hole (outlet) 6, which is defined by sidewall 8. The plug 10 has a cartridge 12 which has two pairs of opposing arms 13 which form an open cage-like structure. The arms 13 extend to the top of the cartridge 12, which is shaped into an annular body 14 with a tapering external edge 15. The annular body 14 forms a conduit and defines an aperture. An o-ring 16 is located in a recess 17 formed around the body 14. The size of the body 14 and cartridge 12 is selected so that the plug can be inserted into a plug hole 6 such that the tapering edge 15 and o-ring 16 seal against the inner wall 8 of the plug hole 6. This means the only route for liquid to flow out of the plug hole 6 in this configuration is through the inside of the annular body 14, i.e. through the aperture. Once it has flowed through the annular body, the liquid escapes from the cartridge 12 through the gaps between the arms 13.

At the opposite end of the cartridge 12, a boss 18 is fixed to the cartridge 12 by being threaded on to a ring member 20 which is held in place by the arms 13 of the cartridge 12.

A sleeve 24 is axially slidably mounted on a portion 25 of the boss 18 that projects above the ring member 20. The sleeve 24 is an integral part of a depressible valve member 28 which is arranged to seal the inside of the annular body 14 to prevent liquid flow therethrough. The valve member 28 is urged away from the boss 18 by a spring 26 located in a space 27 above the portion 25 within the sleeve 24. The inside of the annular body 14 is provided with a downwardly tapering surface 32, and the valve member 28 has a corresponding chamfered surface 29 which is urged into sealing engagement with the surface 32. The tapered surface 29 of the valve member 28 has an o-ring 30 located in a recess 31 for pressing against the surface 32 to ensure a good seal. The surface 32 has a projecting rib 33 for abutting against the o-ring 30.

Thus, at rest, the valve member 28 is urged upwards (in FIG. 1) by the spring 26 so that it seals the inside opening of the annular body 14 and prevents liquid from passing through the cartridge 12. Since the outside of the body 14 seals the plug hole 6, this arrangement prevents liquid from flowing through the plug hole 6, and therefore acts as a conventional plug.

However, as liquid builds up on top of the valve member 28, its weight acts against the spring 26. At a threshold level, the weight of liquid will overcome the spring force and move the valve member 28 downwardly (in FIG. 1), thereby creating a gap between chamfered surface 29 and tapering surface 32 so that liquid can escape through the cartridge 12.

To prevent liquid flow from taps or other liquid input means located over the plug hole 6 from impinging directly on the valve member 28 and thereby accidentally opening it due to the force of the flow, a cover 34 is attached to the cartridge 12. The cover 34 has a convex upper surface for deflecting liquid incident thereon to reduce spray and splash back. The underside of the cover 34 is separated from the annular body 14 by a gap so that liquid can still enter the plug and act against the valve member 28.

A bolt 36 is attached to the boss 18 to adjust the vertical size (extent) of the plug 10. The bolt 36 can be screwed into or out of the boss 18 using interface 38 to adjust the vertical distance between pop-up lever 50 and the annular body 14 to ensure that the cartridge 12 fits snugly into the plug hole 6 when the pop-up lever 50 is in a position which designates that the plug hole 6 is sealed by the plug 10. Additionally, the boss 18 is vertically adjustable with respect to the ring member 20. The boss 18 can be screwed into or out of the ring member 20, which moves the portion 25 further into the sleeve 24. This has the effect of reducing the space 27 and compressing the spring 26, thereby increasing the spring force and requiring a larger weight of liquid to open the valve. In this way the plug 10 can be adjusted for vessels capable of holding liquid to different height levels.

Figure 2:
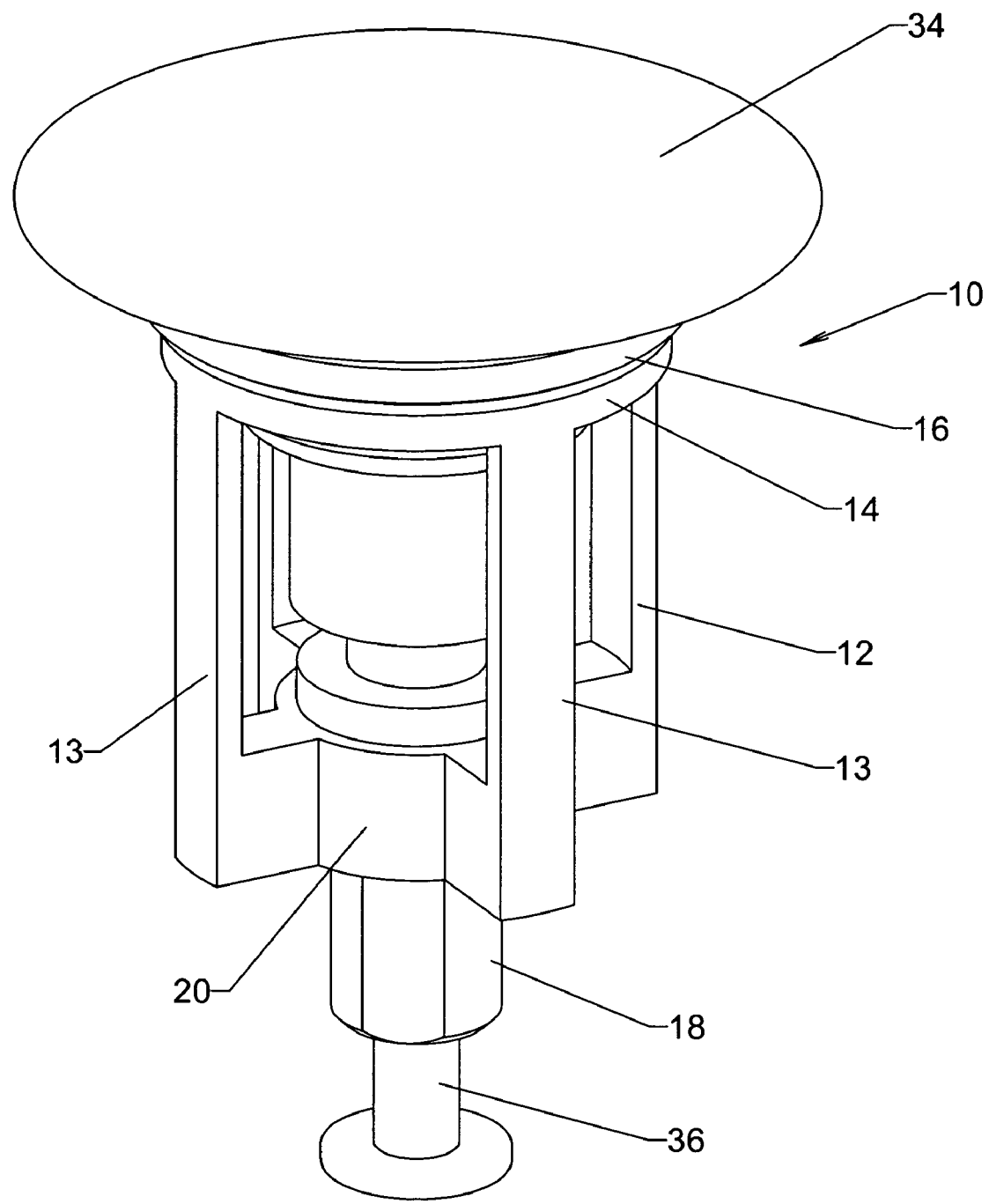
FIG. 2 shows a perspective view of the plug shown in FIG. 1.
Figure 3:
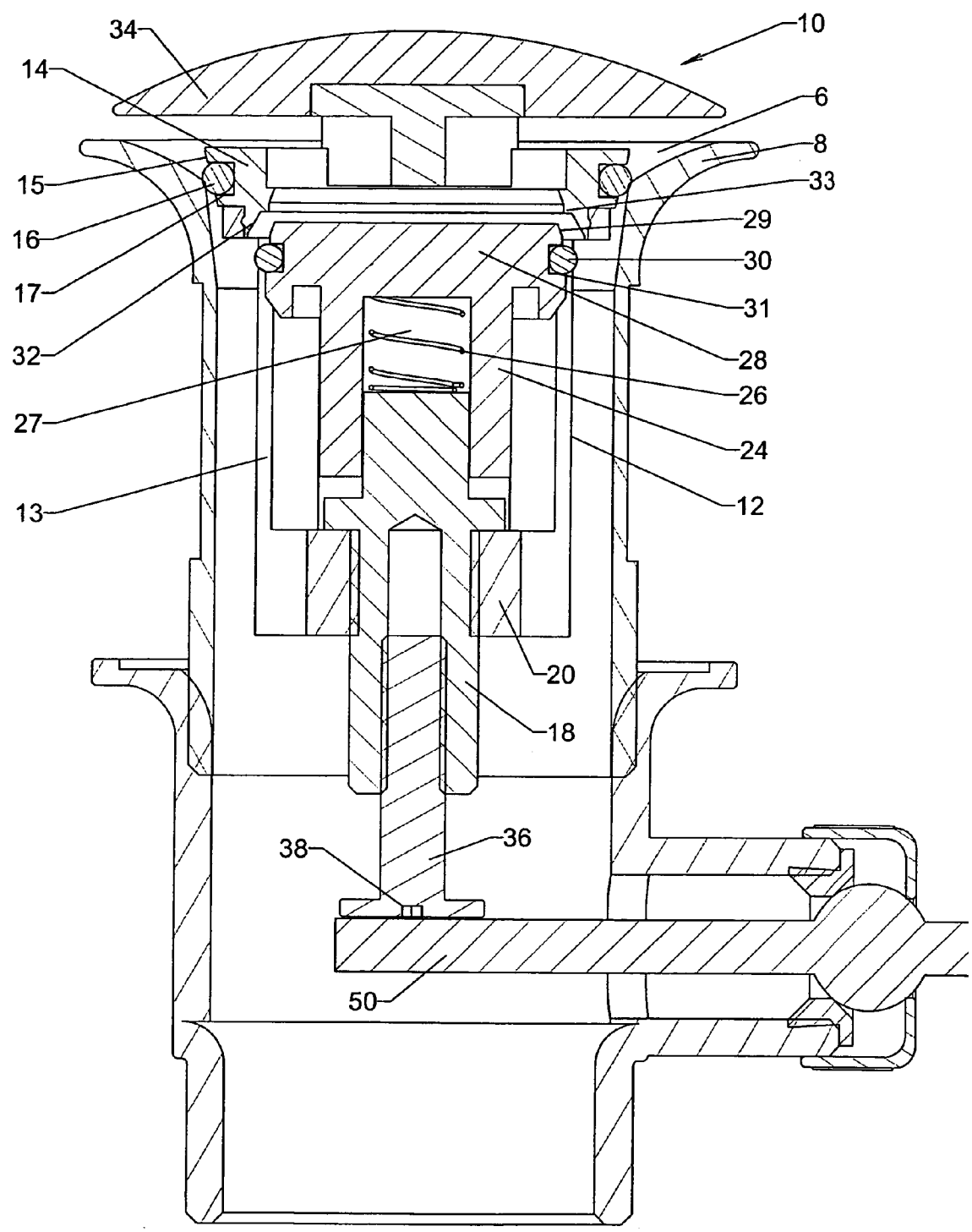
FIG. 3 shows the plug of FIG. 1 where the internal valve is open.
Figure 4:
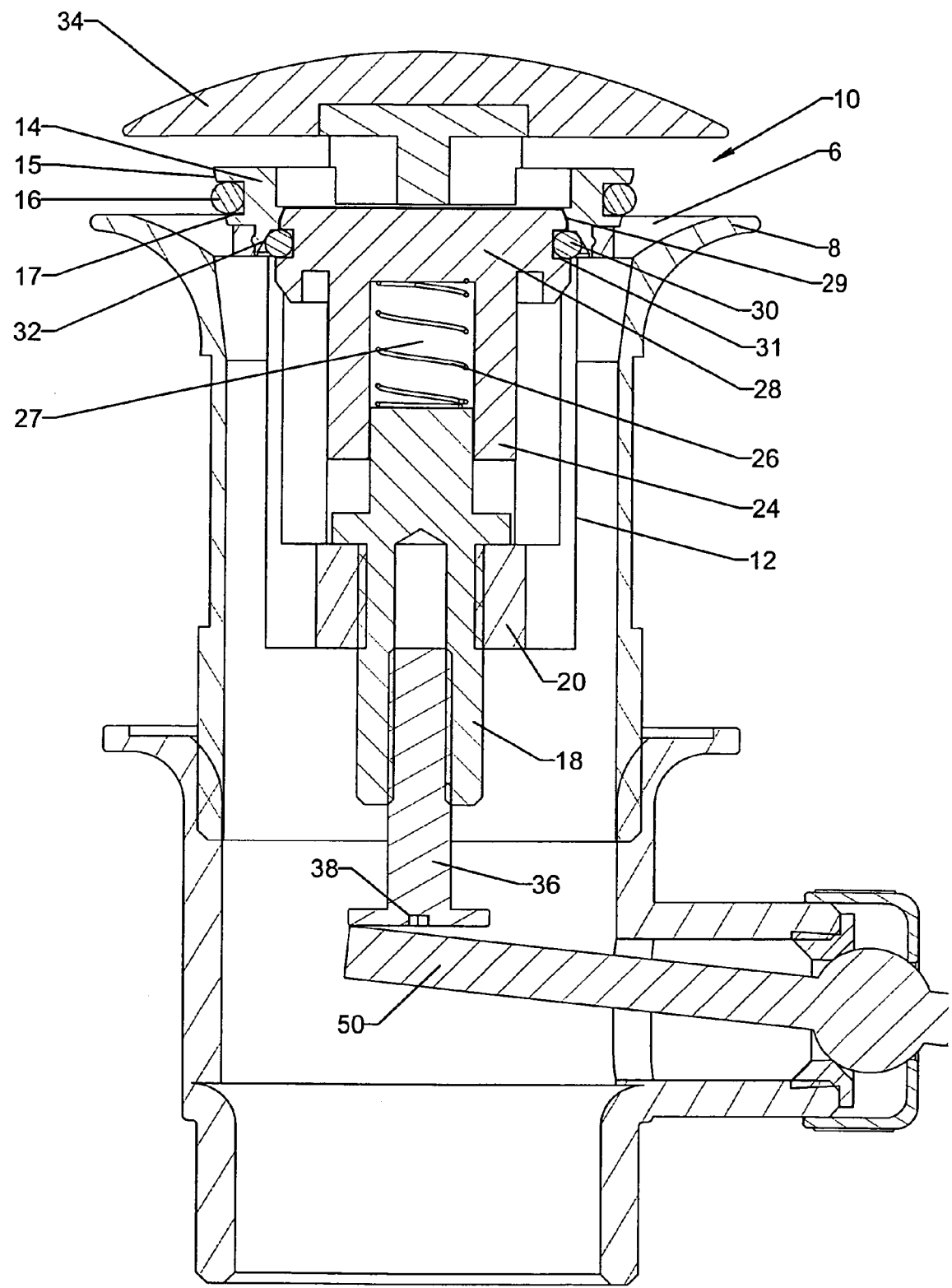
FIG. 4 shows the plug of FIG. 1 in an open configuration.

FIG. 2 shows the exterior of the plug 10. FIGS. 3 and 4 show the operation of the plug 10.

The arrangement shown in the drawings includes a pop-up lever 50 used for moving the plug 10 between an open configuration where the annular body 14 lies above the plug hole opening and a closed configuration where the annular body 14 seals against the sidewall 8 of the plug hole 6 as described above. The pop-up lever 50 is in a lowered position corresponding to the closed configuration in FIGS. 1 and 3, so the plug 10 seals against the sidewall 8 of the plug hole 6. However, FIG. 3 shows the plug 10 when a weight of liquid has forced the valve member 28 to move away from the annular body 14 (downwardly in FIG. 3) to open the seal between the chamfered surface 29 and the tapering surface 32 to allow liquid to flow therebetween out of the plug hole 6.

FIG. 4 shows the pop-up lever in a raised position corresponding to the open configuration. Here the plug 10 is raised out of the plug hole 6 to allow liquid to flow out of the plug hole 6 through a gap between the annular body 14 and the sidewall 8 of the plug hole 6.

Figure 5:
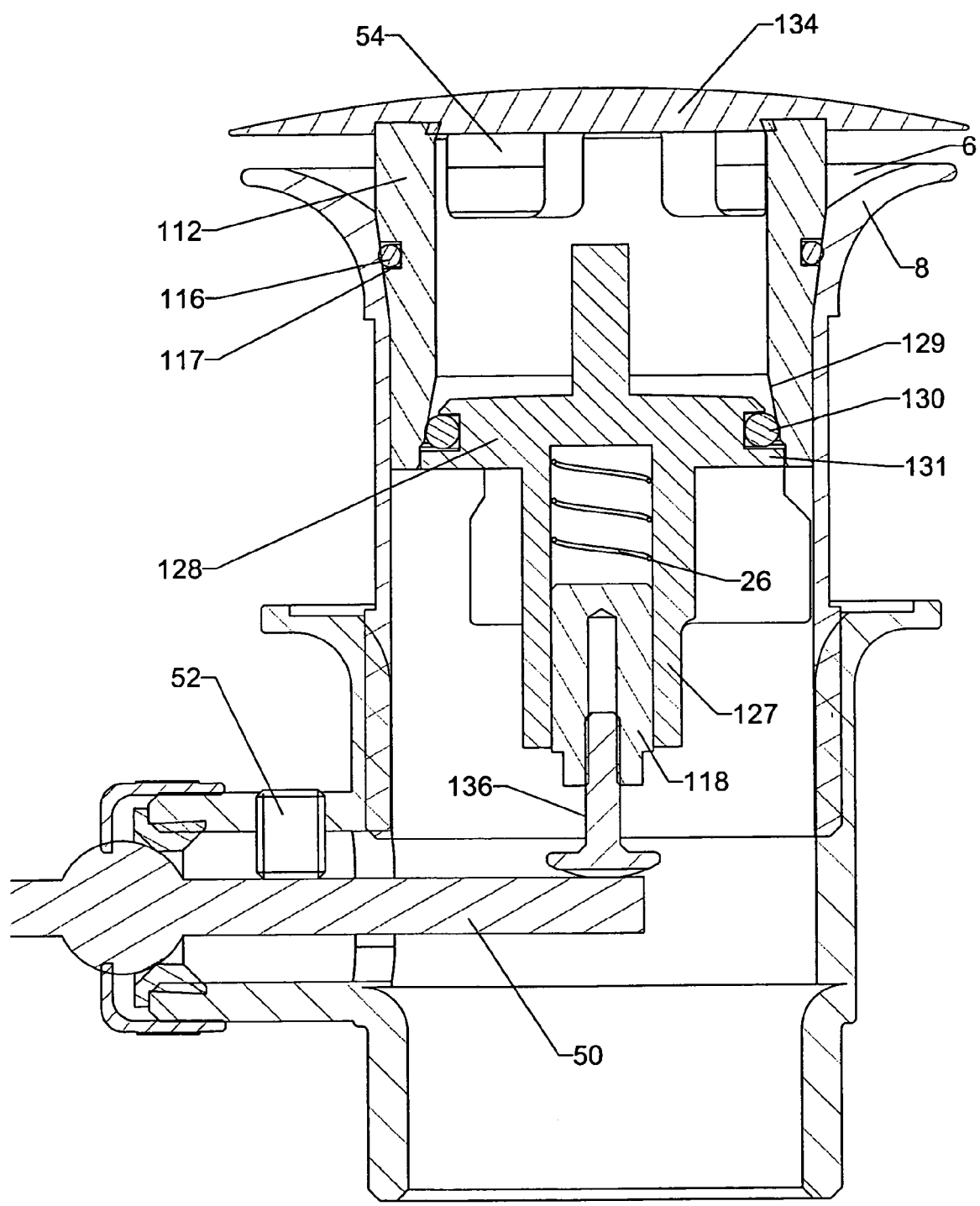
FIG. 5 shows a plug which is a second embodiment of the invention.

FIG. 5 shows an alternative embodiment of the present invention. In FIG. 5, a cartridge 112 and cover 134 are secured in fixed relation to the sidewall 8 of the plug hole 6. An o-ring 116 is located in a recess 117 on the outer surface of the cartridge 112 and forms a seal with the inside of the sidewall 8. Liquid can therefore only drain away through the inside of the cartridge 112, via entrance openings 54. The cartridge 112 is generally fixed in use, but may be removed, e.g. for cleaning.

A valve member 128 is mounted within the conduit formed by the sidewall 8 of the plug hole 6, where it is axially movable relative to the cartridge 112 by operation of the pop-up lever 50. In its raised position, the pop-up lever 50 seals the plug hole 6 by pushing the valve member 128 into sealing contact with the cartridge 112. The valve member 128 has an o-ring 130 located in a recess 131 which abuts the tapered side wall 129 of the cartridge 112. The valve member 128 has a sleeve 127 which is spring loaded on to a boss 118 in a manner similar to that described above. This means that a given weight of liquid can overcome the spring force and cause the valve member 128 to move away from the cartridge 112 and thereby open the plug hole 6, i.e. allow liquid to escape through a gap between the cartridge sidewall 129 and the valve member 128.

To ensure that the valve member 128 seals against the cartridge 112 with the same force each time the conduit is closed, a stop 52 is provided to limit the closing movement of the pop-up lever 50. Thus, the pop-up lever 50 moves to the same position each time the conduit is closed. The spring strength is alterable by adjusting the axial position of screw 136, which is threaded into the boss 118. Altering the overall axial length of the valve member 128 affects how hard it is pushed against the cartridge 112 when the pop-up lever 50 is moved to its closed (raised) position.

In its lowered position, the pop-up lever 50 permits the valve member 128 to fall away from the cartridge 112 under gravity, thereby allowing liquid to flow out of the plug hole 6 through a gap between the cartridge 112 and valve member 128.

Figure 6:
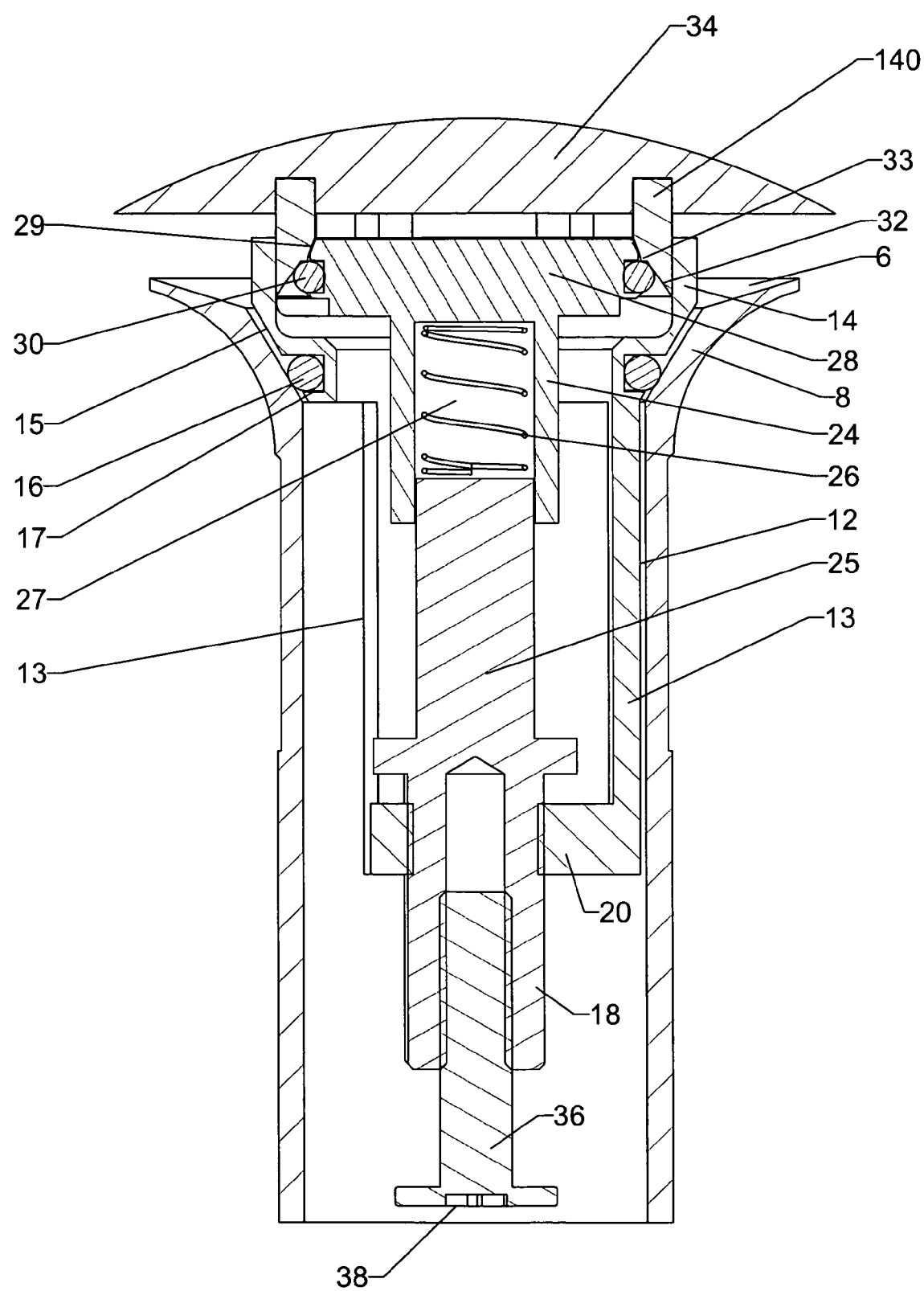
FIG. 6 shows a plug which is a third embodiment of the invention.

FIG. 6 shows yet another embodiment of the present invention. The plug shown in FIG. 6 works in an identical fashion to that shown in FIG. 1, and common parts are given the same reference numbers. The main difference between the plugs in FIG. 1 and FIG. 6 is that the seal formed by valve member 28 is located above the seal formed between the sidewall 8 and annular body 14 (i.e. o-ring 16). To achieve this, the downwardly tapering surface 32 with protruding rib 33 against which the chamfered surface 29 of the valve member 28 is urged into sealing engagement by spring 26 is provided on an inwardly protruding ring member 140 at the top end of annular body 14. The ring member 140 is attached to cover 34 by a plurality of upstanding elements, which define entrance slots therebetween to permit liquid to impinge on the top surface of the valve member 28.

The configuration shown in FIG. 6 permits the valve member 28 to be included in an upper part of the plug which is not constrained by the size (diameter) of the inner wall 8 of the plug hole 6. This enables cartridges of different diameters to be manufactured (e.g. for different sizes of plug hole) whilst keeping constant the surface area of the valve member on which liquid impinges to open the valve.

What is claimed is:

1. A combination of an outlet from a vessel and a plug which is insertable into the outlet to close the vessel thereby allowing it to hold liquid, the plug having:
    a conduit for locating in the outlet;
    sealing means for sealing the conduit in the outlet such that liquid cannot pass through the outlet without also passing through the conduit; and
    a valve located in the conduit the valve comprising a valve member biased against a base,
    wherein the outlet contains a lever operably connectable to the plug, the lever being arranged to move the valve member and base between a first position in which liquid is permitted to bypass the valve and flow through the outlet and a second position in which the valve is arranged to maintain a first configuration in which the valve member is urged into sealing contact with the conduit to prevent liquid from passing therethrough unless pressure on the valve member reaches a threshold value, whereupon the valve member is arranged to move relative to the base to adopt a second configuration in which the conduit is open to allow liquid to flow therethrough.

2. A combination according to claim 1, wherein the lever is arranged to move the plug such that when the lever is in the first position liquid is permitted to flow past the conduit through the outlet and when the lever is in the second position the conduit is sealed in the outlet so that liquid cannot pass through the outlet without also passing through the conduit.

3. A combination according to claim 2, wherein the lever is arranged to move the plug relative to the outlet.

4. A combination according to claim 1, wherein when the lever is in the second position the valve member is biased against the base into the first configuration, the biasing force being selected so that pressure at and above the threshold value overcomes it to cause the valve member to adopt the second configuration.

5. A combination according to claim 4, wherein the base comprising a boss and the valve member comprises a sealing element on a sleeve which is slidably mounted on the boss, the boss being fixed relative to the conduit when the lever is in the second position.

6. A combination according to claim 5, wherein when the lever is in the second position the sleeve is biased by a spring against the boss into the first configuration.

7. A combination according to claim 6, wherein the lever is arranged to move the valve member and base relative to the conduit.

8. A combination according to claim 1, wherein the valve member includes a plate whose periphery seals against the inside of the conduit in the first configuration.

9. A combination according to claim 8, wherein the conduit has a constricted portion against which the plate seals in the first configuration.

10. A combination according to claim 1 including an adjuster for adjusting the valve so that it reacts to a different threshold value.

11. A combination according to claim 4 including an adjuster for adjusting the valve so that it reacts to a different threshold value, wherein the adjuster is arranged to alter the biasing force.

12. A combination according to claim 5 including an adjuster for adjusting the valve so that it reacts to a different threshold value, wherein the axial position of the boss relative to the conduit when the lever is in the second position is adjustable.

13. A combination according to claim 12, wherein the lever is operable connected to the boss by a length adjustable screw.

14. A combination according to claim 1, wherein the plug includes a cover for shielding the valve.

15. A combination according to claim 1, wherein the cover is located over the mouth of the conduit.

16. A plug which is insertable into an outlet from a vessel in order to close the vessel, thereby allowing it to hold liquid, the plug having:
    a conduit for locating in the outlet;
    sealing means for sealing the conduit in the outlet such that liquid cannot pass through the outlet without also passing through the conduit; and
    a valve located in the conduit, the valve comprising a valve member biased against a base,
    wherein the plug is operably connected to a lever which is arranged to move the valve member and base between a first position in which liquid is permitted to bypass the valve and flow through the outlet and a second position in which the valve is arranged to maintain a first configuration in which the valve member is urged into sealing contact with the conduit to prevent liquid from passing therethrough unless pressure on the valve member reaches a threshold value, whereupon the valve member is arranged to move relative to the base to adopt a second configuration in which the conduit is open to allow liquid to flow therethrough.

* * * * *